United States Patent
Moore et al.

(10) Patent No.: US 7,471,637 B2
(45) Date of Patent: Dec. 30, 2008

(54) METHOD AND SYSTEM FOR MONITORING IDLE NETWORK CIRCUITS

(75) Inventors: Francois G. Moore, McKinney, TX (US); Larry H. Steinhorst, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 610 days.

(21) Appl. No.: 10/958,521

(22) Filed: Oct. 4, 2004

(65) Prior Publication Data
US 2006/0072470 A1    Apr. 6, 2006

(51) Int. Cl.
*H04J 1/16* (2006.01)

(52) U.S. Cl. ........................... 370/248; 370/252

(58) Field of Classification Search ................ 370/217, 370/221, 241, 242, 243, 244, 245, 246, 247, 370/248, 252
See application file for complete search history.

(56) References Cited

U.S. PATENT DOCUMENTS

| | | | | | |
|---|---|---|---|---|---|
| 5,349,578 | A * | 9/1994 | Tatsuki et al. | ................ | 370/244 |
| 5,432,789 | A * | 7/1995 | Armstrong et al. | .......... | 370/254 |
| 6,202,170 | B1 * | 3/2001 | Busschbach et al. | .......... | 714/11 |
| 6,618,358 | B2 * | 9/2003 | Mahajan et al. | ............. | 370/242 |
| 6,700,875 | B1 * | 3/2004 | Schroeder et al. | ........... | 370/252 |
| 6,765,876 | B2 * | 7/2004 | Saitoh | ........................ | 370/248 |
| 6,978,337 | B1 * | 12/2005 | Chang | ........................ | 710/306 |
| 7,154,894 | B1 * | 12/2006 | Tsukamoto | .............. | 370/395.1 |
| 2002/0023243 | A1 * | 2/2002 | Tomita | ........................ | 714/704 |
| 2002/0044531 | A1 * | 4/2002 | Cooper et al. | ............... | 370/248 |
| 2002/0186702 | A1 * | 12/2002 | Ramos et al. | ............... | 370/410 |
| 2004/0114526 | A1 * | 6/2004 | Barker | ........................ | 370/245 |

* cited by examiner

*Primary Examiner*—Chirag G Shah
*Assistant Examiner*—Kan Yuen
(74) *Attorney, Agent, or Firm*—Baker Botts L.L.P.

(57) ABSTRACT

A method is provided for monitoring a network that includes providing a path selector that can select between a first input and a second input, where the first input is coupled to a customer premises equipment interface that is operable to receive signals from customer premises equipment and the second input is coupled to a test signal generator that is operable to generate test signals. The method also includes determining whether operating customer premises equipment is coupled to an input of the customer premises equipment interface that is coupled to the first input of the path selector. If not, then an idle state is entered into. While in the idle state, it is determined whether a signal is received from the customer premises equipment interface at the first input of the path selector. The test signal received at the second input of the path selector is selected unless a signal is received from the customer premises equipment interface at the first input. The method also includes communicating the test signal from the path selector to the network.

16 Claims, 2 Drawing Sheets

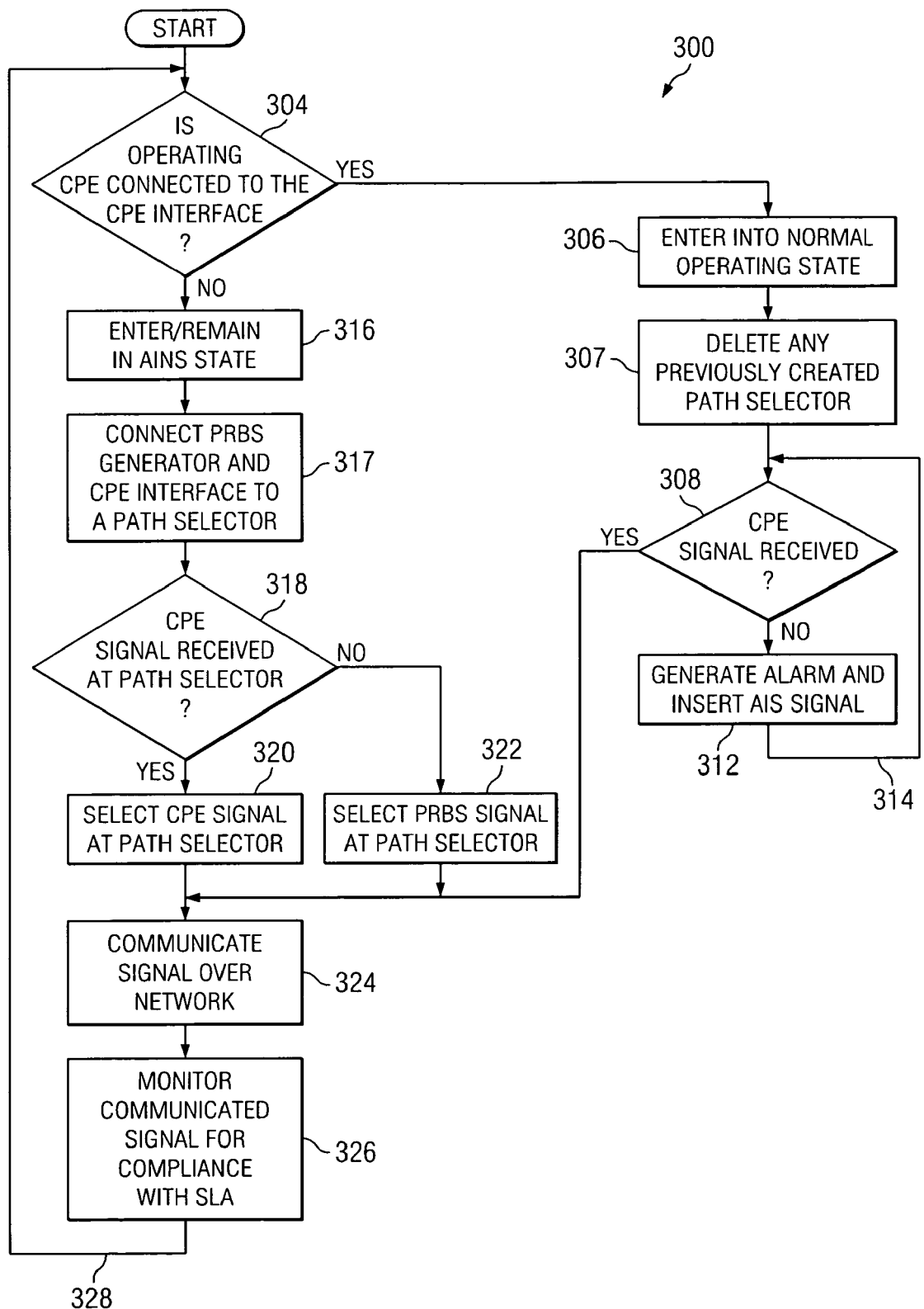

METHOD AND SYSTEM FOR MONITORING IDLE NETWORK CIRCUITS

TECHNICAL FIELD OF THE INVENTION

The present invention relates generally to communication systems and, more particularly, to a method and system for monitoring idle network circuits.

BACKGROUND OF THE INVENTION

Telecommunications systems, cable television systems and data communication networks use networks to rapidly convey large amounts of information between remote points. One type of network used to convey such information is an optical network. In an optical network, information is conveyed in the form of optical signals through optical fibers. Although many different types of optical networks may be used depending on the particular application and network size, one common type of optical network is a Synchronous Optical Network (SONET).

In SONET networks, as well as other types of optical and non-optical networks, it is important to determine whether any errors exist in the communication of signals over the network. If such an error exists, then a network management system and/or network elements in the network may be notified so that the error may be addressed. For example, SONET networks may implement numerous types of protection switching techniques to address errors in the network, such as a node failure or a fiber cut. Furthermore, errors may be monitored to evaluate network compliance with agreements made between a network service provider and a network customer. For example, a network service provider may lease a particular amount of network capacity (for example, a particular number of network circuits) to a network customer and provide a service level agreement (SLA) to the customer guaranteeing the availability, performance, and/or any other appropriate metrics relating to the leased circuits. SONET networks and other types of networks implement techniques to monitor the performance of network circuits or other network connections to evaluate compliance with such SLAs.

However, although a customer may lease a number of circuits, the customer may not always use all of the leased circuits. For example, a customer may lease additional circuits for future use or for back-up use. Such circuits may not have customer premises equipment (CPE) connected to the circuit or such CPE may be inactive (meaning able to operate, but not sending any signals over the circuit). When an activated (for example, leased) circuit is not receiving any traffic from the CPE, SONET and other network elements typically generate alarm signals indicating the lack of an incoming signal. However, such alarm signals interfere with the monitoring of these circuits, and thus interfere with the evaluation of these circuits' compliance with an SLA and with other monitoring of the circuits.

SUMMARY OF THE INVENTION

The present invention provides a method and system for monitoring idle network circuits that substantially eliminates or reduces at least some of the disadvantages and problems associated with previous methods and systems.

In accordance with a particular embodiment of the present invention, a method is provided for monitoring a network that includes providing a path selector that can select between a first input and a second input, where the first input is coupled to a customer premises equipment interface that is operable to receive signals from customer premises equipment and the second input is coupled to a test signal generator that is operable to generate test signals. The method also includes determining whether operating customer premises equipment is coupled to an input of the customer premises equipment interface that is coupled to the first input of the path selector. If not, then an idle state is entered into. While in the idle state, it is determined whether a signal is received from the customer premises equipment interface at the first input of the path selector. The test signal received at the second input of the path selector is selected unless a signal is received from the customer premises equipment interface at the first input. The method also includes communicating the test signal from the second input of the path selector to the network.

Technical advantages of particular embodiments of the present invention include a method and system for monitoring idle network circuits that allows the performance of such idle network circuits to be monitored even though the circuits are not in use by the customer. Such monitoring may be important to evaluate the performance of the idle circuits with respect to an SLA. Particular embodiments of the present invention may allow such monitoring by inserting a test signal on idle circuits instead of the alarm signal that is typically inserted in many networks (which prevents the monitoring of the circuit). In this manner, customers may ensure that the performance metrics guaranteed in an SLA are being met, and if such metrics are not met, may ensure proper resolution of the problem pursuant to the SLA (for example, by obtaining a refund of fees for the circuit and/or by obtaining service on the circuit to bring the circuit into compliance with the SLA).

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which:

FIG. 3 illustrates an example method for monitoring idle circuits in a network, in accordance with one embodiment of the present invention.

DETAILED DESCRIPTION OF THE INVENTION

Figure 1:
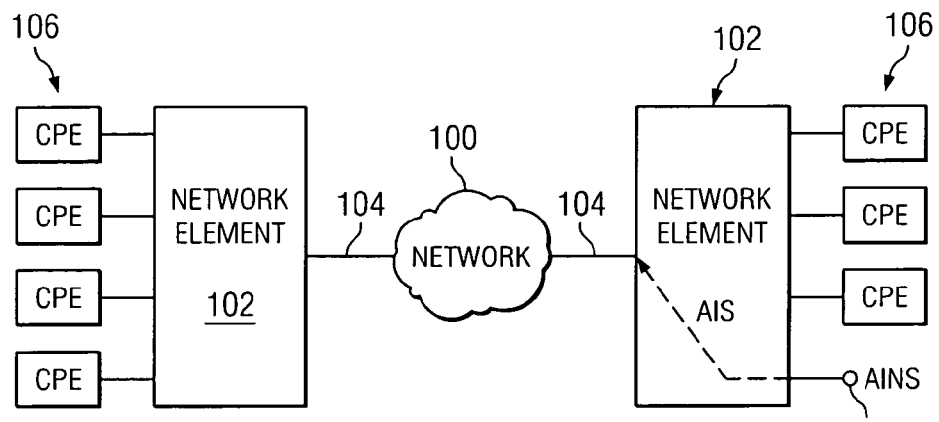
FIG. 1 illustrates an example network for communicating information between network elements using communication links.

FIG. 1 illustrates an example network 100 for communicating information between network elements 102 using communication links 104. Network 100 generally represents any collection of hardware and/or software that communicates information between network elements 102. Network 100 may be any suitable type of network that includes monitored communication circuits or channels; however, for the purposes of example herein, network 100 will be described as a SONET optical network. Network 100, in this example, may be any type of SONET network, such as a point-to-point network, a point-to-multipoint network, a hub network, or a ring network. Links 104 generally represent any suitable interconnection, directly or indirectly, of network elements

102. Embodiments of the present invention may apply equally to other types of optical networks, such as synchronous digital hierarchy (SDH) networks, or to non-optical networks, such as non-optical asynchronous transfer mode (ATM) networks and Frame Relay networks.

Network elements 102 may include any appropriate hardware and/or software that receives information communicated over network 100 processes that information in any suitable fashion, and/or communicates information to network 100. Network elements 102 are each operable to communicate traffic to and receive traffic from links 104. In particular, each element 102 receives traffic from CPEs 106 associated with network customers and adds that traffic to links 104 for communication over network 100. Each network element 102 also receives traffic from links 104 and drops traffic destined for the local CPEs 106. As used throughout this description and the following claims, the term "each" means every one of at least a subset of the identified items. In adding and dropping traffic, elements 102 may combine data from CPEs 106 for transmission over links 104 and may drop channels of data from links 104 destined for local CPEs 106. Network elements 102 may include multiplexers, demultiplexers, optical and/or electrical switches, amplifiers, transponders, and/or any other suitable hardware and/or software for processing signals received from and to be transmitted to network 100.

As described above, capacity in the network 100 may be leased by or otherwise dedicated to a particular customer. For example, each CPE 106 may have an associated circuit over which the CPE 106 may send and receive traffic to and from network 100. The customer with which a CPE 106 is associated may have an SLA with the network service provider that guarantees the availability, performance, or any other appropriate metrics relating to the circuit. For example, the network service provider that provisions and maintains the circuit may guarantee that the circuit will be available at all times and may refund a particular percentage of a monthly fee paid by the customer for the circuit for each hour that the circuit is unavailable. Therefore, network elements 102 and/or other network components include appropriate software and/or hardware to monitor the performance of network circuits or other network connections to evaluate compliance with SLAs. Furthermore, a network operations center (NOC) or other suitable locations may include appropriate software and/or hardware to provide this performance monitoring and SLA compliance function.

As described above, although a customer may lease a number of circuits, the customer may not always use all of the leased circuits. For example, a customer may lease additional circuits for future use or for emergency back-up use. Such circuits may not have CPE 106 connected to the circuit (as indicated at arrow 108) or such CPE 106 may be inactive (able to operate, but not sending any signals over the circuit). In SONET and other types networks, when a network element 102 fails to receive traffic over an activated circuit, the network element 102 typically generates an alarm signal indicating the lack of an incoming customer signal. For example, in a SONET network, if a network element 102 fails to receive any signals from an activated circuit (for example, a Loss of Signal (LOS) condition), the network element 102 may generate an alarm indication signal (AIS) that is inserted into the SONET overhead frames associated with that circuit (as illustrated in FIG. 1). For example, a path AIS (AIS-P) signal may be included in the path overhead of affected SONET frames (STS frames). In addition, the network element 102 may generate an alarm that is communicated to the NOC. The implementation and operation of such AIS signals and associated alarms is well-known in the art and will not be described in further detail herein.

Such AIS signals and associated alarms can be helpful to indicate a problem when a CPE 106 that was previously transmitting signals has stopped due to a problem with the CPE 106 or with the link between the CPE 106 and the network element 102 (since the problem may then be addressed). However, AIS signals and alarms can be problematic when the lack of traffic from the CPE 106 is intentional. Such situations may occur, for example, when no CPE 106 is connected to an activated circuit, when a CPE 106 connected to an activated circuit is not yet being used, or when CPE 106 connected to an activated circuit which is used only sporadically (for example, for back-up purposes).

One reason that AIS signals and alarms can be problematic in these cases is because the NOC will receive numerous "false" alarms from network elements 102. Such false alarms may inhibit the efficient operation of the network or may just provide an annoyance to network operators. To solve this problem, many current implementations of SONET network elements 102 have an "automatic in-service" (AINS) capability to prevent the initiation of alarms to the NOC in the situations mentioned above (and in other appropriate situations). For example, as illustrated in FIG. 1, if CPE 106 is not connected to an activated circuit, AINS may inhibit NOC alarming for that circuit since the failure to receive any signals for that circuit is a normal and expected condition. Once CPE 106 is connected to the circuit and begins to communicate traffic to the network element 102, the AINS functionality will then stop inhibiting alarms when no signal is received from the associated CPE 106 (since in this case, the absence of signal could indicate a real problem). An interface unit coupled to the CPE (described below) will detect the presence of a signal and the software will decide, after a waiting period verifying that the signal is consistently present, to remove the AINS condition.

However, current implementations of AINS do not inhibit the communication of an AIS signal over network 100 in the affected circuit. For many purposes, this is not a problem and the AIS serves to provide information to other network elements 102 about the status of the circuit. Therefore, at any one time in a typical SONET network, there are a number of SONET frames that may include AIS signals in their overhead section due to inactive CPE, and these AIS signals do not impede the normal operation of the network. However, these "false" AIS signals do interfere with the monitoring of the associated circuits, and thus interfere with the evaluation of these circuits' compliance with an SLA and with other monitoring of the circuits.

The problem arises from the fact that an AIS signal (or other similar signals) causes other network elements 102 to ignore the contents of the payload content of the SONET frames (or other similar frames) that include an AIS signal in the frame overhead. Therefore, the contents of the payload (and/or other portions of the frame) cannot be monitored for the purposes of determining compliance with an SLA. Due to the presence of the AIS signal, for the purposes of determining compliance with an SLA, a properly functioning AINS idle circuit that is available for use is indistinguishable from a defective circuit that is unavailable for use. Thus, neither the network service provider nor the customer can determine whether the unused AINS circuit is in compliance with the SLA. Such compliance monitoring is important to the customer since it is typically paying for the circuit regardless of whether the customer is actually using the circuit, and the customer wants to receive rebates or other compensation for times when the activated, but unused circuit is not available or otherwise not in compliance with the SLA.

Particular embodiments of the present invention solve this problem by communicating a test signal over a circuit when the circuit is in AINS state or otherwise not yet being used by the customer to which the circuit has been allocated. Unlike frames including AIS or other similar signals, frames including such a test signal can be monitored to ensure compliance of the unused circuit with an associated SLA.

Figure 2:
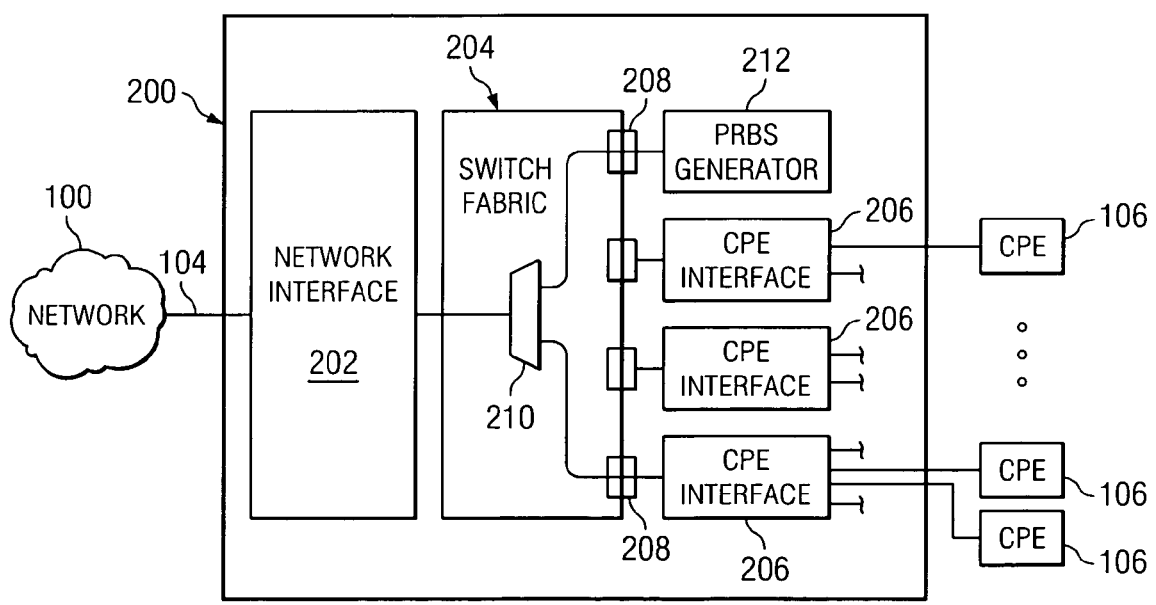
FIG. 2 illustrates an example network element enabling idle circuit performance monitoring, in accordance with one embodiment of the present invention.

FIG. 2 illustrates an example network element 200 enabling idle circuit performance monitoring, in accordance with one embodiment of the present invention. The example network element 200 includes interface units and a switch fabric unit coupled across a backplane. The backplane may comprise copper or other suitable connections to couple together both illustrated and non-illustrated components of network element 200. Although only selected components of network element 200 are illustrated in FIG. 2 at a high level, it should be understood that network element 200 may include any other well-known components of a SONET or other network element as appropriate for the operation of network element 200. As examples only, network element 200 may be a terminal multiplexer (path terminating equipment) or an add/drop multiplexer.

As illustrated, network element 200 includes a network interface 202 that serves to communicate traffic to and receive traffic from a network, such as network 100, to which network element 200 is coupled. For example, network interface 202 may comprise one or more transceivers for transmission and receipt of traffic. Network interface 202 may also or alternatively comprise any combination of optical and/or electrical components for communicating traffic through the network.

Network element 200 also includes one or more CPE interfaces 206 that each receive traffic from one or more CPEs 106 and that prepare the traffic for communication over the network to which network element 200 is coupled. As an example only, a particular CPE interface 206 may receive a DS-1 or DS-3 traffic stream from CPE 106 and map that traffic stream into SONET frames as appropriate for communication over network 100 (or another network to which network element 200 is coupled). Although three CPE interfaces 206 are illustrated, it should be understood that any suitable number of CPE interfaces 206 may be included in network element 200 depending upon the implementation.

Network element 200 also includes a switch fabric 204 that couples CPE interfaces 206 to network interface 202. CPE interfaces 206 are coupled to switch fabric 204 via input ports 208. Depending on the implementation, switch fabric 204 may perform many different well-known functions to facilitate the operation of network node 200. For example, switch fabric 204 typically connects any number of input ports 208 together through the switch fabric 204 to establish any type of point-to-point or point-to-multipoint connection. Although switch fabric 204 may have many other functions, the function relevant to the illustrated embodiment is the ability to select between two different signals and to communicate the selected signal to network interface 202 for communication on the network. To facilitate this signal selection, switch fabric 204 includes one or more path selectors 210. Such path selectors 210 may be built into the switch fabric.

Network element 200 also includes a pseudo-random bit sequence (PRBS) generator 212 that is coupled to path selector 210. PRBS generator 212 may be implemented on a card or other devices connected to switch fabric 204, or may alternatively be built into switch fabric 204. PRBS generator 212 generates a PRBS test signal. PRBS generators are typically used to test network segments when an error has occurred. For example, a technician may be sent out into the field and connect a PRBS generator to the network to test various network performance metrics.

The illustrated embodiment uses PRBS generator 212 in network element 200 in another manner—as a replacement for the AIS or other similar signal that is communicated from network element 200 when a CPE interface 206 is in the AINS state and does not receive a signal from the associated inactive CPE 106. More specifically, each CPE interface 206 may be coupled to one or more respective path selector 210, which are each coupled to a respective PRBS generator 212 (although only one path selector 210 coupled to one CPE interface 206 and one PRBS generator 212 are shown in the illustrated embodiment). In particular embodiments, the output of a single PRBS generator 212 may be communicated to any number of path selectors 210.

Each path selector 210 is configured to select between a signal input (if any) from the associated CPE interface 206 and the PRBS signal input from the associated PRBS generator 212. For example, if path selector 210 receives a PRBS signal from the associated PRBS generator 212 and does not receive a signal from the associated CPE interface 206, then path selector 210 in will select the PRBS signal to be output to network interface 202. For example, if CPE 106 is connected but not yet being used (i.e., the circuit is in an AINS state), then path selector 210 will select the PRBS signal and cause the PRBS signal to be sent to network interface 202 for communication over the network. The presence of this PRBS signal, which is placed in the payload section of SONET or other frames to be communicated over the network, preempts the insertion of an AIS signal into the overhead of these frames since the PRBS signal is a "valid" signal.

Therefore, in these situations, instead of "empty" frames being sent with AIS signals in their overhead, network element 202 sends out frames that include the PRBS test signal. The PRBS or other test signal thus acts as a "dummy" signal or replacement signal for the lack of traffic on an unused circuit in AINS state. In particular embodiments, such a selection of the PRBS signal may occur only when network element 202 is in an AINS state. Once the associated CPE 106 begins communicating traffic on the circuit (a normal operating state), path selector 210 will select the incoming traffic from the CPE 106 instead of the PRBS signal and the path selector 210 will be deleted (or otherwise disconnected from CPE 106) as soon as the connection associated with CPE 106 is removed from the AINS state. Such a selection of the CPE traffic may be facilitated by coupling the associated CPE interface 206 to the "preferred" side of path selector 210 and connecting PRBS generator 212 to the "non-preferred" side. Therefore, when path selector 210 receives two viable signals (one from the associated CPE interface 206 and one from the associated PRBS generator 212), path selector 210 will automatically select the signal from the associated CPE interface 206. Once the associated CPE 106 begins to use the circuit and is thus in a normal operating state (i.e., once the circuit is no longer in an AINS state), the ability to select the PRBS signal will be discontinued by deleting the path selector so that any failure to receive traffic from the CPE 106 will result in the normal alarming procedures (including the sending of an AIS signal in the circuit). Network element 200 and/or switch fabric 204 may include appropriate hardware and/or software to implement the switching functions and path selector deletion described above.

Unlike SONET frames including AIS or other similar signals, frames including PRBS signals are just like normal SONET frames (except that they contain a test signal instead of actual customer traffic and the traffic type in the path overhead identifies the traffic type as being PRBS test traffic). Furthermore, just like normal SONET frames, frames containing a PRBS signal are able to be monitored by network elements 200 and/or other components of the network to determine if the associated circuit or other communication channel is in compliance with an SLA (or to otherwise perform performance monitoring). Therefore, if there is an error or other event in the network affecting a circuit's compliance with an SLA, then this error and its effect on the circuit can be detected even though the customer is not using the circuit and the network service provider can gather SLA compliance data. It should be noted that although a PRBS generator 212 is described herein, any other suitable "test signal" generator may be used. The term "test signal" shall be used to refer to any signal that may be inserted into frames communicated from network element 202 in place of an absence of an incoming signal from CPE 106 or other devices and that allows performance monitoring of the circuit in which the frames are communicated.

Furthermore, in addition to providing the advantages discussed above, the incorporation of a PRBS generator in a network element may also have other benefits. For example, when a particular circuit needs to be tested, a PRBS generator in an appropriate network element on the network may be connected to the circuit (for example, through a path selector 210 or a direct connection through switch fabric 204) and may transmit a test signal for testing purposes. The incorporation of PRBS generators in network elements allows the NOC to test the network remotely without having to send out a technician to connect a PRBS or other test signal generator to the network at the appropriate location. This remote testing is much more efficient and cost-effective than sending out a technician to perform testing.

FIG. 3 illustrates an example method 300 for monitoring idle circuits in a network, in accordance with one embodiment of the present invention. The example method 300 begins at step 304 where the network element determines whether there is an operating CPE or other device coupled to the CPE interface. For example, the network element may determine whether traffic is being received from a CPE associated with the circuit.

If such an operating CPE is connected to the circuit, the network element enters into a normal operating state with respect to that circuit at step 306. If the network element has been in AINS state (as will be described with respect to steps 316 through 320), the network element may wait a certain amount of time (a soak time) to ensure that traffic is continued to be received from the CPE before leaving the AINS state for a normal operating state. Although the PRBS signal may be received by the path selector during this soak time, the path selector does not choose this PRBS signal over the CPE signal since the CPE signal is received at the preferred input of the path selector. If the network element was in AINS state, at step 307 the path selector created for the AINS state (at step 317) is deleted. At step 308, the network element determines whether a signal is still being received from the CPE. If a signal is received, it is communicated over the network at step 324. If a signal is no longer being received from the CPE while in the normal operating state at step 308, the network element inserts an AIS signal into the circuit (in the overhead of the frames communicated in the circuit) and generates appropriate alarms. Such alarming is typically appropriate since some type of signal is expected from operating CPE and the lack of such a signal may indicate a problem with the CPE, the CPE's connection to the network element, or one or more components of the network element responsible for receiving the CPE signal. As indicated by arrow 314, the above process repeats itself continuously while the network element is operating.

If the network element determines at step 304 that an operating CPE is not connected to the CPE interface associated with a particular circuit (for example, no CPE is connected or an inactive CPE is connected), then at step 316 the network element enters in an AINS state or any other suitable idle state with respect to that circuit. At step 317, the CPE interface port associated with the particular circuit and a PRBS generator signal are both connected to a path selector on the switch fabric. As described above, in this AINS state, the path selector will select the PRBS signal over an absence of a CPE signal (and thus not cause the generation of AIS signals). At step 318, the network element determines whether a signal has been received from the CPE (which would indicate that an operating CPE has now been connected to the CPE interface).

If a CPE signal is not received at the path selector at step 318 (as is typical in the AINS state), then the path selector selects the PRBS signal input from the PRBS generator. As described above, the path selector (when in the AINS state) selects the PRBS signal since there is no signal received at input side connected to the CPE interface. If a CPE signal is received at the path selector at step 318, the path selector receives and selects the CPE signal (over the PRBS signal) at step 320. Again, the path selector may perform such a selection since the CPE signal input is coupled to the preferred input side of the path selector. Furthermore, once the method returns to step 304 (after progressing through steps 324 and 326, described below), the network element will proceed to step 306 since the receipt of a CPE at step 318 serves to indicate that operating CPE has now been connected to the CPE interface (or previously connected inactive CPE has been placed into operation).

When a CPE signal or PRBS signal is selected at the path selector at one of steps 320 or 322 or if a CPE signal is received at step 308, the CPE or PRBS signal is communicated over the network at step 324. For example, the selected signal may be communicated to a network interface of the network element, from which it is transmitted on the network. At step 326, these communicated signals are monitored by the network for compliance with an SLA or for any other appropriate purposes. As described above, such monitoring may be performed on PRBS signals just as it is performed on normal CPE signals. As indicated by arrow 328, the method repeats itself continuously while the network element is operating.

It should be understood that some of the steps illustrated in FIG. 3 may be combined, modified or deleted where appropriate, and additional steps may also be added to the flowchart. Additionally, as indicated above, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of components included within network element 200, other and different components may be utilized to accommodate particular needs. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for monitoring a network, comprising:
   providing a path selector operable to select between a first input and a second input of the path selector, the first input of the path selector coupled to a customer premises equipment interface operable to receive signals from customer premises equipment and to communicate the received signals to the first input of the path selector, the second input of the path selector coupled to a test signal generator operable to generate test signals and to communicate the test signals to the second input of the path selector;
   determining whether operating customer premises equipment is coupled to an input of the customer premises equipment interface that is coupled to the first input of the path selector;
   if operating customer premises equipment is not coupled to the input of the customer premises equipment interface, then entering into an idle state;
   while in the idle state, determining whether a signal is received from the customer premises equipment interface at the first input of the path selector;
   while in the idle state, selecting the test signal received at the second input of the path selector unless a signal is received from the customer premises equipment interface at the first input; and
   communicating the test signal from the path selector to the network, the test signal able to be monitored by the network.

2. The method of claim 1, wherein the test signal comprises a pseudo-random bit sequence (PRBS) signal.

3. The method of claim 1, wherein having no customer premises equipment coupled to the input of the customer premises equipment interface or having inactive customer premises equipment coupled to the input of the customer premises equipment interface results in a determination that operating customer premises equipment is not coupled to the input of the customer premises equipment interface.

4. The method of claim 1, wherein the idle state comprises an automatic in-service (AWIS) state.

5. The method of claim 1, further comprising entering into a normal operating state if it is determined that operating customer premises equipment is coupled to the input of the customer premises equipment interface.

6. The method of claim 5, further comprising:
   while in the normal operating state, determining whether a signal is received from the customer premises equipment; and
   if a signal is not received from the customer premises equipment, generating an alarm indication signal.

7. The method of claim 1, further comprising monitoring the communicated test signal to evaluate compliance of the network with a service level agreement.

8. The method of claim 1, wherein the network comprises a synchronous optical network (SONET).

9. A network element coupled to a network, comprising:
   a customer premises equipment interface operable to receive signals from customer premises equipment;
   a test signal generator operable to generate test signals;
   a path selector operable to select between a first input and a second input of the path selector, the first input of the path selector coupled to the customer premises equipment interface and operable to receive signals from the customer premises equipment interface, the second input of the path selector coupled to the test signal generator and operable to receive test signals from the test signal generator; and
   wherein the network element is operable to:
      determine whether operating customer premises equipment is coupled to an input of the customer premises equipment interface that is coupled to the first input of the path selector;
      enter into an idle state if operating customer premises equipment is not coupled to the input of the customer premises equipment interface;
      while in the idle state, determine whether a signal is received from the customer premises equipment interface at the first input of the path selector;
      while in the idle state, select the test signal received at the second input of the path selector unless a signal is received from the customer premises equipment interface at the first input; and
      communicate the test signal from the path selector to the network, the test signal able to be monitored by the network.

10. The network element of claim 9, wherein the test signal comprises a pseudo-random bit sequence (PRBS) signal.

11. The network element of claim 9, wherein having no customer premises equipment coupled to the input of the customer premises equipment interface or having inactive customer premises equipment coupled to the input of the customer premises equipment interface results in a determination that operating customer premises equipment is not coupled to the input of the customer premises equipment interface.

12. The network element of claim 9, wherein the idle state comprises an automatic in-service (AINS) state.

13. The network element of claim 9, wherein the network element is further operable to enter into a normal operating state if it is determined that operating customer premises equipment is coupled to the input of the customer premises equipment interface.

14. The network element of claim 13, wherein the network element is further operable to:
   while in the normal operating state, determine whether a signal is received from the customer premises equipment; and
   if a signal is not received from the customer premises equipment, generate an alarm indication signal.

15. The network element of claim 9, wherein the network element comprises a synchronous optical network (SONET) element.

16. A network element coupled to a network, comprising:
   a customer premises equipment interface operable to receive signals from customer premises equipment;
   a pseudo-random bit sequence (PRBS) signal generator operable to generate PRBS signals;
   a path selector operable to select between a first input and a second input of the path selector, the first input of the path selector coupled to the customer premises equipment interface and operable to receive signals from the customer premises equipment interface, the second input of the path selector coupled to the PRBS signal generator and operable to receive PRBS signals from the test signal generator; and wherein the network element is operable to:
  determine whether operating customer premises equipment is coupled to an input of the customer premises equipment interface that is coupled to the first input of the path selector;
  enter into a normal operating state if it is determined that operating customer premises equipment is coupled to the input of the customer premises equipment interface or enter into an automatic in-service (AINS) state if operating customer premises equipment is not coupled to the input of the customer premises equipment interface;
  determine whether a signal is received from the customer premises equipment interface;
  if a signal is received from the customer premises equipment interface while in the AINS state, select the signal after the signal is received at the first input of the path selector and delete the path selector; and
  if a signal is not received from the customer premises equipment interface:
    while in the AINS state, select the PRBS signal received at the second input of the path selector; or
    while in the normal operating state, communicate an alarm indication signal.

* * * * *